US012798155B2

(12) United States Patent
Biland et al.

(10) Patent No.: US 12,798,155 B2
(45) Date of Patent: Nov. 17, 2026

(54) FIBER STRUCTURAL REINFORCEMENT WITH FRICTIONAL SURFACE COATING

(71) Applicant: Rock Fiber, Inc., Houston, TX (US)

(72) Inventors: Oleksandr Biland, The Woodlands, TX (US); Atay Biland, The Woodlands, TX (US)

(73) Assignee: Rock Fiber, Inc., Houston, TX (US)

( * ) Notice: Subject to any disclaimer, the term of this patent is extended or adjusted under 35 U.S.C. 154(b) by 147 days.

(21) Appl. No.: 18/507,737

(22) Filed: Nov. 13, 2023

(65) Prior Publication Data

US 2024/0165853 A1 May 23, 2024

Related U.S. Application Data

(60) Provisional application No. 63/426,240, filed on Nov. 17, 2022.

(51) Int. Cl.

| | |
|---|---|
| ***B29B 15/04*** | (2006.01) |
| ***B29B 13/02*** | (2006.01) |
| ***B29B 15/14*** | (2006.01) |
| ***C03C 13/06*** | (2006.01) |
| ***C04B 14/14*** | (2006.01) |

(Continued)

(52) U.S. Cl.
CPC .............. *B29B 15/14* (2013.01); *B29B 13/02* (2013.01); *C08K 7/04* (2013.01); *B29K 2105/0023* (2013.01); *B29K 2105/16* (2013.01); *B29K 2309/14* (2013.01); *B29K 2507/04* (2013.01); *C03C 13/06* (2013.01); *C04B 14/14* (2013.01)

(58) Field of Classification Search
CPC ... C08K 7/04; C08K 7/08; C08K 7/10; C08K 3/042; C03C 13/06; C04B 14/14; B29B 15/14; B29B 13/02; B29K 2105/16; B29K 2105/0023; B29K 2309/14; B29K 2507/04
See application file for complete search history.

(56) References Cited

U.S. PATENT DOCUMENTS 6,245,424 B1 * 6/2001 Lau .................... B28B 23/0006 428/408
7,238,402 B2 7/2007 Swales et al.
(Continued)

FOREIGN PATENT DOCUMENTS

AU 2020104279 A4 3/2021
CN 111205028 A 5/2020
(Continued)

*Primary Examiner* — Jeremy R Pierce
(74) *Attorney, Agent, or Firm* — Neo IP

(57) ABSTRACT

The present invention is directed to fiber composite structures, including one or more composite fibers or igneous rock fibers, such as basalt fibers and/or andesite fibers, that are impregnated with a polymer resin and subsequently coated with a frictional additive, such as aluminum oxide. The frictional additive provides for improved frictional engagement when the fiber composite structures are included in concrete or other structural materials and reduces alkaline degradation of the composite structures within the concrete over time. A process for manufacturing the fiber composite structures is also described herein. The process includes inductive heating of the fiber composite structures in order to cure the polymer resin, so as to affectively apply heat without being impeding by the external layer of frictional additive.

19 Claims, 5 Drawing Sheets

(51) Int. Cl.

| | |
|---|---|
| ***C08K 7/04*** | (2006.01) |
| *B29K 105/00* | (2006.01) |
| *B29K 105/16* | (2006.01) |
| *B29K 309/00* | (2006.01) |
| *B29K 507/04* | (2006.01) |

(56) References Cited

U.S. PATENT DOCUMENTS

| | | | | |
|---|---|---|---|---|
| 7,790,284 | B2 | 9/2010 | Davies | |
| 8,042,363 | B2 | 10/2011 | Kibol et al. | |
| 9,862,641 | B2 | 1/2018 | Anast et al. | |
| 10,369,754 | B2 | 8/2019 | Biland et al. | |
| 10,953,625 | B2 | 3/2021 | Lazzara et al. | |
| 2013/0239503 | A1 | 9/2013 | Miller et al. | |
| 2015/0017447 | A1 | 1/2015 | Moravek et al. | |
| 2019/0092686 | A1 | 3/2019 | Moireau et al. | |
| 2019/0232579 | A1 | 8/2019 | Biland et al. | |
| 2019/0242116 | A1* | 8/2019 | Lee | E04B 1/64 |
| 2019/0256418 | A1* | 8/2019 | Riley | C04B 14/42 |
| 2021/0017766 | A1 | 1/2021 | Hartman et al. | |
| 2021/0245455 | A1 | 8/2021 | Biland et al. | |
| 2021/0245456 | A1 | 8/2021 | Biland et al. | |
| 2022/0016807 | A1 | 1/2022 | Hochstetter et al. | |

FOREIGN PATENT DOCUMENTS

| | | | | |
|---|---|---|---|---|
| CN | 111689719 | A | 9/2020 | |
| CN | 112632747 | A | 4/2021 | |
| CN | 113831102 | B | 7/2022 | |
| RU | 2690334 | C2 | 5/2019 | |
| WO | 2013079482 | A1 | 6/2013 | |
| WO | WO-2022056410 | A1 * | 3/2022 | B29C 53/562 |

* cited by examiner

FIBER STRUCTURAL REINFORCEMENT WITH FRICTIONAL SURFACE COATING

CROSS REFERENCES TO RELATED APPLICATIONS

This application is related to and claims priority to and the benefit of U.S. Provisional Application No. 63/426,240, filed Nov. 17, 2022, which is incorporated herein by reference in its entirety.

BACKGROUND OF THE INVENTION

1. Field of the Invention

The present invention relates to fiber composite structures including improved surface coatings and more specifically to fiber composites for strengthening of concrete or other structural materials.

2. Description of the Prior Art

It is generally known in the prior art to provide fiber reinforcement in concrete and other structural materials, most notably in high tensile steel fiber concrete.

Prior art patent documents include the following:

U.S. Pat. No. 10,369,754 for Composite fibers and method of producing fibers by inventors Biland et al., filed Feb. 3, 2017 and issued Aug. 6, 2019, discloses composite fibers created by a process including vertically texturizing and impregnating resin into the fibers at controlled viscosity results in stronger fibers in which virtually no microbubbles are trapped resulting in improved tensile strength for use in reinforcing concrete and other materials.

US Patent Publication No. 2019/0232579 for Composite fibers and method of producing fibers by inventors Biland et al., filed Apr. 5, 2019 and published Aug. 1, 2019, discloses composite fibers created by a process including vertically texturizing and impregnating resin into the fibers at controlled viscosity results in stronger fibers in which virtually no microbubbles are trapped resulting in improved tensile strength for use in reinforcing concrete and other materials.

U.S. Pat. No. 8,042,363 for Composition and method for producing continuous basalt fibre by inventors Kibol et al., filed Dec. 25, 2006 and issued Oct. 25, 2011, discloses producing continuous organic fibers by stretching from molten minerals. These fibers can be used for producing heat resistant threads, rovings, cut fibers, fabrics, composite materials and products based thereon. The inventive glass has the following chemical composition in mass percentage: 15.9-18.1 $Al2O3$, 0.75-1.2 $TiO2$, 7.51-9.53 $Fe2O3$+$FeO$, 6.41-8.95 $CaO$, 2.5-6.4 $MgO$, 1.6-2.72 $K2O$, 3.3-4.1 $Na2O$, 0.23-0.5 $P205$, 0.02-0.15 $SO3$, 0.12-0.21 $MnO$, 0.05-0.19 $BaO$, impurities up to 1.0, the rest being $SiO2$. The inventive method consists in loading a ground composition in a melting furnace, in melting said composition, in homogenizing a melt, in consequently stabilizing the melt in the melting furnace feeder, in drawing and oiling the fiber and in winding it on a spool. Prior to loading, the composition is held in an alkali solution for 15-20 minutes, and is then washed with flowing water for 20-30 minutes and dried. After having been washed with flowing water, the dried composition is loaded into the melting furnace.

US Patent Publication No. 2021/0245455 for Method of producing improved composite fibers by inventors Biland et al., filed Apr. 27, 2021 and published Aug. 12, 2021, discloses improved composite fibers, and structural materials mixed with the improved composite fibers, produced by an improved process that vertically texturizes and impregnates resin into the fibers without introducing any substantial amount of microbubbles in the resin. By using vertical impregnation and twisting of fiber strands with specific viscosity control, stronger composite fibers, in which substantially no microbubbles are trapped, are produced with improved tensile strength and lower variance in tensile strength, for use in strengthening structural concrete and other structural materials.

US Patent Publication No. 2021/0245456 for Composite fibers by inventors Biland et al., filed Apr. 27, 2021 and published Aug. 12, 2021, discloses improved composite fibers, and structural materials mixed with the improved composite fibers, produced by an improved process that vertically texturizes and impregnates resin into the fibers without introducing any substantial amount of microbubbles in the resin. By using vertical impregnation and twisting of fiber strands with specific viscosity control, stronger composite fibers, in which substantially no microbubbles are trapped, are produced with improved tensile strength and lower variance in tensile strength, for use in strengthening structural concrete and other structural materials.

U.S. Pat. No. 7,790,284 for Flexible composite prepreg materials by inventor Davies, filed Sep. 24, 2008 and issued Sep. 7, 2010, discloses a flexible, low-bulk pre-impregnated (pre-preg) towpreg, which is the resultant impregnation of a low pressure impregnation of a bundle of un-spread fiber tows arranged in a predetermined cross-sectional shape. During the low pressure impregnation process, the resin does not enter into the fiber bundle, but rather only coats the surface fibers comprising the tow, resulting in un-coated fibers in the core of the prepreg and with molten resin, partially adhering onto and around the exterior fibers of the fiber bundle such that the interior fibers remain uncoated and a thin, irregular sheath of resin is created on and around the exterior of the fiber bundle surrounding the core of dry fibers.

US Patent Publication No. 2019/0092686 for Silica-coated composite fiber for the reinforcement of concrete by inventors Moireau et al., filed Mar. 9, 2017 and published Mar. 28, 2019, discloses a composition and method for making composite fibers used in the reinforcement of concrete. The composite fibers comprise a plurality of silica-coated glass fibers. The silica particles provide an improved interface between the composite fibers and the concrete matrix.

US Patent Publication No. 2021/0017766 for FRP rebar and method of making same by inventors Hartman et al., filed Apr. 23, 2019 and published Jan. 21, 2021, discloses a fiber-reinforced plastic (FRP) rebar for reinforcing concrete, as well as systems for and methods of making the FRP rebar.

U.S. Pat. No. 10,953,625 for Unidirectional fiber composite system for structural repairs and reinforcement by inventors Lazzara et al., filed Jan. 22, 2015 and issued Mar. 23, 2021, discloses a composite system for the reinforcement of physical structures including a plurality of unidirectional fibers arranged with respective longitudinal axes generally parallel to each other over a substantial portion of a length of each unidirectional fiber. The plurality of unidirectional fibers are non-mechanically connected. A resinous material adheres the plurality of unidirectional fibers to each other such that each one of the plurality of unidirectional fiber is adhered to at least one adjacent one of the plurality of unidirectional fibers along a substantial portion of the length of the adjacent one of the plurality unidirectional fibers.

U.S. Pat. No. 9,862,641 for Fiber reinforced cementitious composition by inventors Anast et al., filed Feb. 23, 2017 and issued Jan. 9, 2018, discloses a fiber reinforced cementitious composition comprising a cementitious binder and at least one synthetic inorganic reinforcing fiber type, wherein the synthetic inorganic reinforcing fiber type comprises at least one of a man-made mineral fiber type such as basalt fibers, an aluminosilicate wool fiber type or an alkaline earth silicate wool fiber type.

U.S. Patent Publication No. 2013/0239503 for Reinforcement bar and method for manufacturing same by inventors Miller et al., filed Oct. 21, 2011 and published Sep. 19, 2013, discloses reinforcement bars for concrete structures, comprising continuous, parallel fibers, made of basalt, carbon, glass fiber, or the like, embedded in a cured matrix, each bar being made of at least one fiber bundle comprising a number of parallel, cylindrical cross section fibers and said bars being provided with a surface shape and/or texture which contributes to good bonding with the concrete. Part of the surface of each bar being deformed prior to or during the curing by: a) strings of an elastic or inelastic, and/or b) at least one deformed section of each reinforcement bar; thereby producing a roughened surface.

Australian Patent Application No. 2020/104279 for Preparation method of basalt fiber sticks for use in concrete by inventors Huang et al., filed Dec. 23, 2020 and issued Mar. 11, 2021, discloses a preparation method of basalt fiber sticks for use in concrete. The preparation method includes step 1. covering, by a covering unit, a basalt fiber bundle with a cladding layer which is formed from a plastic material melting at a temperature of above 230° C., 5 and step 2. conveying the basalt fiber bundle downstream and extruding, by a pair of cold press molding rollers of a reinforcement molding unit, the cladding layer at a temperature ranging from 170° ° C. to 190° C., thereby forming peripheral reinforcements of the cladding layer, where the reinforcement is a protrusion or a depression; the reinforcement molding unit includes a pair of cold press molding rollers, and each cold press molding roller has a molding pit or a molding bulge in/on 10 outer surface thereof. According to the present disclosure, the technical problem of insufficient connection strength between the basalt fiber and the concrete in the prior art is solved.

Chinese Patent Publication No. 111205028 for Reinforced fiber cement and preparation method thereof, filed Mar. 27, 2020 and published May 29, 2020, discloses a reinforced fiber cement, which comprises a basalt fiber base material and cement; the basalt fiber base materials are distributed in the cement in a disorderly way; the basalt fiber base material comprises basalt fibers, a binder and a prepreg. The high-strength high-toughness high-strength steel has high strength, good toughness and good durability and corrosion resistance; the raw materials are environment-friendly, the basalt fiber is directly melted and drawn to form the basalt fiber, the product is natural and environment-friendly, and the carbon dioxide emission in the smelting process is greatly reduced. The present invention also provides a method of preparing the reinforced fiber cement as described above, including the steps of, S1, preparing a basalt fiber base material; s2, uniformly adding the basalt fiber base material into cement according to a proportion. The method has the advantages of simple process flow, low production cost, no chemical change in the preparation process, no waste residue discharge, low water consumption and environment-friendly production process.

Chinese Patent Publication No. 113831102 for Continuous basalt fiber reinforced phosphate group geopolymer composite material and preparation method thereof, filed Sep. 30, 2021 and issued Jul. 5, 2022, discloses a continuous basalt fiber reinforced phosphate group geopolymer composite material and a preparation method thereof, wherein the preparation method comprises the pretreatment of basalt fibers; vacuum impregnating the pretreated basalt fiber with a phenolic resin solution, and carbonizing and cracking at high temperature to prepare the basalt fiber with a surface interface layer; calcining kaolin powder to obtain metakaolin powder; uniformly mixing metakaolin powder and a phosphoric acid solution to obtain phosphate group geopolymer slurry; printing phosphate group geopolymer slurry on basalt fibers with a surface interface layer, and then stacking the basalt fibers layer by layer on a prefabricated mold to form a rough blank; curing, demolding and maintaining; and carrying out surface treatment on the silicon resin solution to obtain the composite material. The prepared composite material is composed of phosphate group geopolymer and continuous basalt fiber dispersed in the phosphate group geopolymer. The composite material has excellent mechanical property and high temperature resistance, and the preparation method has the advantages of low energy consumption cost, environment-friendly and simple process.

Chinese Patent Publication No. 112632747 for Hybrid basalt-polypropylene fiber reinforced concrete dynamic strength calculation method, filed Nov. 23, 2020 and published Apr. 9, 2021, discloses a method for calculating the dynamic strength of hybrid basalt-polypropylene fiber reinforced concrete, which is calculated according to the following formula: the method has mature theoretical basis, clear calculation process and particularly good consistency of the fitting result and the test result, can effectively express the change rule of the strength of the HBPRC along with the strain rate and the confining pressure, and can effectively reflect the influence of the doping type of the fiber and the change of the pore structure characteristics of the HBPRC on the dynamic mechanical property of the HBPRC.

Chinese Patent Publication No. 111689719 for Basalt fiber reinforced asphalt concrete and preparation method thereof, filed Jun. 19, 2020 and published Sep. 22, 2020, discloses basalt fiber reinforced asphalt concrete and a preparation method thereof, wherein the basalt fiber reinforced asphalt concrete comprises the following components in percentage by mass: 13-25% of matrix asphalt, 53-65% of coarse aggregate, 11-20% of fine aggregate, 1-2% of silica fume, 2-5% of mineral powder and 6-13% of modified basalt fiber, wherein the modified basalt fiber is nano titanium dioxide coated basalt fiber, the modified basalt fiber is used as a reinforcing agent of asphalt concrete, and the prepared asphalt concrete for an asphalt pavement has excellent mechanical property and ultraviolet aging resistance, and can help to absorb and degrade automobile exhaust.

Russian Patent No. 2,690,334 for Reinforcing composite fibre by inventor Pikalov, filed Sep. 19, 2017 and issued May 31, 2019, discloses production of synthetic fibres which can be used in production of concrete. Described is a reinforcing composite fibre intended for use in making concrete mixtures, made of threads of mineral fibres arranged mainly parallel to each other and embedded in two-component epoxy mixture, made with excess acid hardener in comparison with optimum content, providing complete curing of epoxy mixture, or with alkaline curing agent deficiency compared to optimum content ensuring complete curing of epoxide mixture.

WIPO Patent Publication No. 2013/079482 for Fiber-reinforced concrete by inventors Plaggenborg et al., filed Nov. 27, 2012 and published Jun. 6, 2013, discloses a mixture of high-strength concrete (HFB), in particular ultra high-strength concrete (UHFB) and reinforcing fibers, characterized in that the reinforcing fibers are present as separated bundles in the ultra high-strength concrete such that the bundles are surrounded essentially on all sides by the concrete.

SUMMARY OF THE INVENTION

The present invention relates to fiber composites including improved surface coatings and more specifically to fiber composites for strengthening of concrete or other structural materials.

It is an object of this invention to provide improved structural fiber reinforcements to concrete to improve the tensile strength of the concrete, and improving the tendency of the structural fiber reinforcement to be engaged and remain within the concrete when tensile stress is applied to the concrete.

In one embodiment, the present invention is directed to a fiber composite structural reinforcement, including one or more igneous rock filaments impregnated with at least one plastic resin and coated with at least one frictional coating as described herein.

In another embodiment, the present invention is directed to a method for producing a fiber composite structural reinforcement, including impregnating a bundle of igneous rock filaments with at least one plastic resin and coating the impregnated bundle with at least one frictional coating as described herein.

These and other aspects of the present invention will become apparent to those skilled in the art after a reading of the following description of the preferred embodiment when considered with the drawings, as they support the claimed invention.

DETAILED DESCRIPTION

Figure 1:
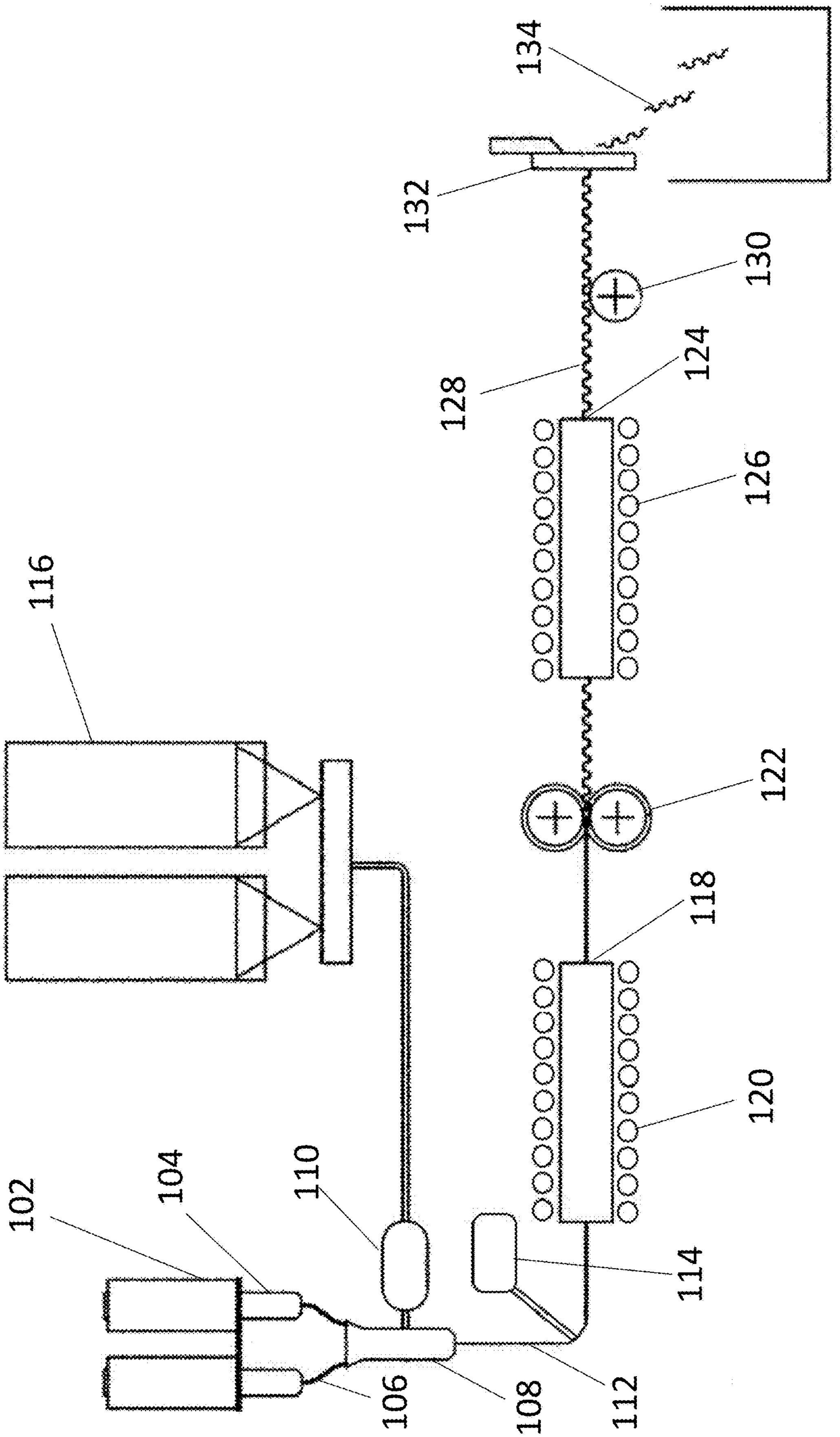
FIG. 1 illustrates a diagram of a system for producing fiber composite structures according to one embodiment of the present invention.

The present invention is generally directed to fiber composites including improved surface coatings and more specifically to fiber composites for strengthening of concrete or other structural materials.

In one embodiment, the present invention is directed to a fiber composite structural reinforcement, including one or more igneous rock filaments impregnated with at least one plastic resin and coated with at least one frictional coating as described herein.

In another embodiment, the present invention is directed to a method for producing a fiber composite structural reinforcement, including impregnating a bundle of igneous rock filaments with at least one plastic resin and coating the impregnated bundle with at least one frictional coating as described herein.

None of the prior art discloses composite fiber-reinforced minibars with applied frictional coatings to improve retention of the minibars within concrete or other structural materials.

Many common structural materials, most notably concrete, are chosen for their ability to withstand high compressive loads, which is the predominant loading regime for most construction materials, due to the force of gravity. However, materials such as concrete tend to perform notably poorly in tension, having a relatively low ultimate tensile strength and a brittle failure mode that lends itself easily to catastrophic failure. While concrete is generally under predominately compressive stress, concrete used in specific types of structures, including bridges and arches, is also under almost constant tensile stress. Furthermore, disturbances to structures where the concrete is generally under compressive stresses (e.g., buildings) often still impose tensile stresses that the concrete needs to withstand. For example, phenomena such as earthquakes often apply unusual tensile loads to structures normally in compression, leading these structures to fail if they lack ability to perform in tension.

Steel fibers have been added to concrete to improve mechanical properties since the 1970s. These steel fibers are intended to improve properties such as ductility, toughness, energy absorption, and crack prevention. Many of these properties arise from steel fibers' far greater tensile strength relative to concrete. However, even as steel fibers provide improved mechanical properties in reinforced concrete, still greater improvements are needed to better prevent cracks and absorb energy in the concrete. One solution, proposed inventions such as those described in U.S. Pat. No. 10,369,754 and U.S. Patent Pub. No. 2021/0245456, utilizes composite fibers to provide increased strength to concrete. While the composite fiber structures described in these inventions do demonstrate greatly improved properties relative to steel, the cured external polymer resin in the composite fiber structures tends to react with the concrete, creating a small liquid boundary layer between the composite fiber structures and the surrounding concrete. This liquid boundary layer further tends to be alkaline in nature, causing potential degradation to basalt fibers within the composite fiber structures, due to the alkali-silica reaction. Not only does this tend to degrade some of the thickness of the composite fiber structures, thereby reducing their mechanical performance, but this also causes the composite fiber structures to less readily engage when the concrete is in tension. By not engaging as readily when the concrete is in tension, the concrete tends to fail quicker than is optimal given the enhanced properties of the fibers, and some of the fibers tend to slip out, unbroken, after the concrete has failed. Therefore, a method of increasing the frictional contact between the fiber composite structures and the surrounding concrete is needed.

The present invention includes using frictional additives to coat the composite structures to improve performance. Prior art documents, including U.S. Pat. No. 10,369,754, describe applying sizing agents as coatings to fibers in order to protect and lubricate the fibers. However, applying sizing agents to the fibers themselves is not sufficient in cases where a fiber composite structure (i.e., a fiber impregnated with resin) is inserted into a concrete block, as the sizing agent in that case is not external to the fiber composite structure, but is largely between the fibers and the impregnated resin and therefore not substantially in contact with the concrete. Elsewhere, prior art documents, such as U.S. Pat. No. 7,790,284 and U.S. Patent Publication Nos. 2021/0245455 and 2019/0092686, describe coating composite fibers, but use the term "coating" in reference to the impregnated resin itself, and not in reference to any external frictional coating applied over the impregnated resin. Therefore, what is needed are new composite fiber structures, having improved compatibility with the concrete and which therefore more readily engage in tension than previous structures.

Referring now to the drawings in general, the illustrations are for the purpose of describing one or more preferred embodiments of the invention and are not intended to limit the invention thereto.

The present invention describes a method for creating minibars, defined as short resin impregnated composite fiber structures, for inclusion into structural materials (e.g., concrete) in order to provide improved structural properties for the concrete. Preferably, the inclusion of minibars obviates the need for steel fibers in the concrete or even for large rebar included in the concrete due to the improved properties of the composite fibers relative to steel. Importantly, the minibars described herein are coated with frictional additives to improve the frictional interface between the minibars and the surrounding structural material.

FIG. 1 illustrates a diagram of a system for producing fiber composite structures according to one embodiment of the present invention. In one embodiment, one or more roving bobbins 102 are unwound and the fibers 106 are fed through one or more air blower texturizers 106 into a resin impregnator 108. In one embodiment, the fibers include composite fibers, preferably including igneous rock fibers, such as basalt fibers and/or andesite fibers. In another embodiment, the fibers include carbon fiber and/or fiberglass. Resin is fed into the resin impregnator 108 through at least one viscosity stabilizer 110 from at least one resin melting chamber 116. In one embodiment, the resin is a polyurethane resin. In one embodiment, the resin includes a thermosetting polymer, including but not limited to epoxy, polyester, polyvinyl ester, thermoset polyurethane, and/or other thermosetting polymers. In another embodiment, the resin includes a thermoplastic polymer, including polyurethane, thermoplastic polyurethane (TPU), polyethylene (e.g., low-density polyethylene (LDPE), high-density polyethylene (HDPE), ultra-high molecular weight polyethylene (UHMWPE), etc.), polypropylene, polycarbonate, polyvinyl chloride (PVC), polystyrene, polytetrafluoroethylene, and/or any other suitable polymer. One of ordinary skill in the art will understand that the resin is able to include a pure polymer resin (i.e., including only a single polymer), or a mixed polymer resin (i.e., including a mixture of a plurality of different polymers). In one embodiment, the polymer resin includes at least one conductivity additive for increasing the electrical conductivity of the polymer resin. In one embodiment, the at least one conductivity additive includes at least one metal powder (e.g., copper powder) and/or at least one carbon allotrope (e.g., graphite, graphene, etc.). In the case of graphene being used for the at least one conductivity additive, the graphene is able to be added in a variety of forms, including as graphene nanoplatelets.

The now resin-coated fibers 112 exit the resin impregnator 116 and pass toward a first curing station 118. In one embodiment, before the resin-coated fibers 112 enter the first curing station 118, at least one frictional coating is applied to the fibers 112 via a frictional applicator 114. In one embodiment, the frictional applicator 114 applies the at least one frictional coating via a spray mechanism. In another embodiment, as the resin-coated fibers 112 move toward the first curing chamber 118, the fibers 112 contact a surface of the frictional applicator 114 including the at least one frictional coating, such that the at least one frictional coating is rubbed off on the fibers 112. The present invention is not limited to a single frictional applicator 114 but is able to include any number of frictional applicators 114 having the same or different mechanisms that are described herein. In one embodiment, the at least one frictional coating includes aluminum oxide (i.e., alumina). One of ordinary skill in the art will understand that the at least one frictional coating is able to include any substance that does not react with the polymer resin or the composite fibers used in the composite fiber structures (or "minibars"), such that the composite fiber structures do not degrade. Furthermore, in a preferred embodiment, the at least one frictional coating does not react with concrete, preventing or reducing the formation of a liquid layer between the composite fiber structures and the surrounding concrete.

The addition of at least one frictional coating, such as alumina, is beneficial for improving the concrete-fiber structure interface, but presents its own challenges. For example, the process used in documents such as U.S. Pat. No. 10,369,754 and U.S. Patent Pub. No. 2021/0245456, utilizes external heat in a plurality of curing chambers to cure the polymer resin and stabilize the composite fiber structure. However, the at least one frictional coating renders these existing processes practically unusable, as the at least one frictional coating prevents the external heat from adequately reaching the polymer resin, thereby preventing, or at least greatly increasing the time for, the curing process. For this reason, significant changes must be made to the curing process used in order to adapt to the usage of a frictional additive coating. Importantly, these adaptations were not previously needed for cases where the coating is merely applied as a sizing agent to the fibers themselves, as that coating is not external to the impregnated resin and therefore does not prevent application of external heat.

The fibers 112 enter the first curing chamber 118. In one embodiment, the first curing chamber 118 includes one or more induction coils 120. The one or more induction coils 120 inductively heat the at least one polymer resin, such that the curing process is able to continue without external heat needing to be transported through the at least one frictional coating. In one embodiment, the inclusion of the at least one conductivity additive increases the effectiveness of the inductive heating process. In one embodiment, the at least one frictional coating is not added to the fibers until after the fibers have exited the first curing chamber 112. In this embodiment, the first curing chamber 118 is capable of utilizing direct heating or inductive heating, as the at least one frictional coating is not yet impeding the transport of external heat into the polymer resin.

In one embodiment, after exiting the first curing chamber 118, the fiber composite structures 112 pass through one or more shaping gears 122, which shape the fiber composite structures 112 into a non-linear shape (e.g., a square wave structure as shown in FIG. 1, a wave structure, etc.). However, in another embodiment, no shaping gears are used and the fiber composite structures 112 passes straight from the first curing chamber 112 to the second curing chamber 124. Unexpectedly, the benefits of providing surface ridges or non-linear structure to the fiber composite structures are relatively low. Instead, due to the fluid interface between the composite structures and the surrounding concrete, during tension, the fiber composite structures are pulled into a straight linear pattern and then begin slipping, still without substantially engaging in tension. As this is an unexpected outcome, one of ordinary skill in the art is unlikely to have modified the processes described in U.S. Pat. No. 10,369,754 and U.S. Patent Pub. No. 2021/0245456 to remove the one or more shaping gears 122. Therefore, the at least one frictional coating instead provides a benefit previously expected to have been provided by the shaping of the fiber composite structures.

The fiber composite structures then enter the second curing chamber 124. In one embodiment, the second curing chamber 124 includes one or more induction coils 126. The one or more induction coils 126 inductively heat the at least one polymer resin, such that the curing process is able to continue without external heat needing to be transported through the at least one frictional coating. In one embodiment, the inclusion of the at least one conductivity additive increases the effectiveness of the inductive heating process.

One of ordinary skill in the art will understand that the system and method of the present invention are not limited to two curing chambers. Any number of curing chambers are able to be included to ensure that the polymer resin fully cures. Additionally, one of ordinary skill in the art will understand that, in one embodiment wherein the resin is a thermoplastic polymer, the curing chambers cool, rather than heat, the composite fiber structure, while those embodiments utilizing thermosetting resins have curing chambers that heat the composite fiber structure as previously mentioned.

After curing in the second curing chamber 124, the cured composite fiber structure 128 exits the chamber 124. In one embodiment, the cured composite fiber structures passes over at least one support roller 130 and is cut into individual short composite fiber structures (or "minibars") 134 by at least one cutting tool 132. In one embodiment, each minibar 134 has a length of approximately 2 inches. In one embodiment, each minibar 134 has a length between approximately 1 inch and approximately 2 inches. In another embodiment, each minibar 134 has a length between approximately 1 inch and approximately 2.5 inches. In one embodiment, each minibar 134 has a diameter of between approximately 0.5 mm and about 2 mm. However, one of ordinary skill in the art will understand that the length and diameter of the minibars 134 described herein are not intended to be limited.

Figure 2:
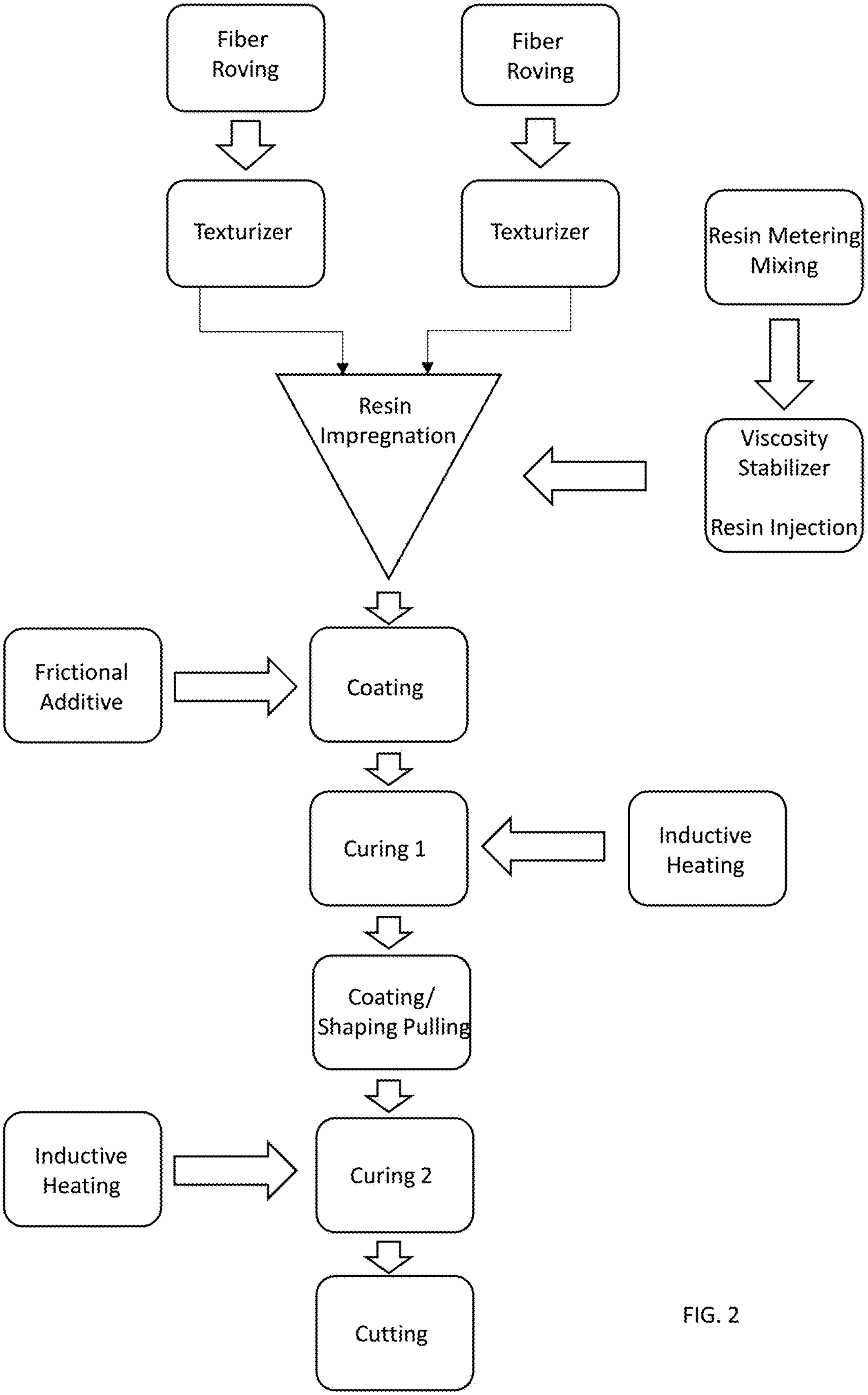
FIG. 2 illustrates a flow diagram of a process for producing fiber composite structures according to one embodiment of the present invention.
Figure 3:
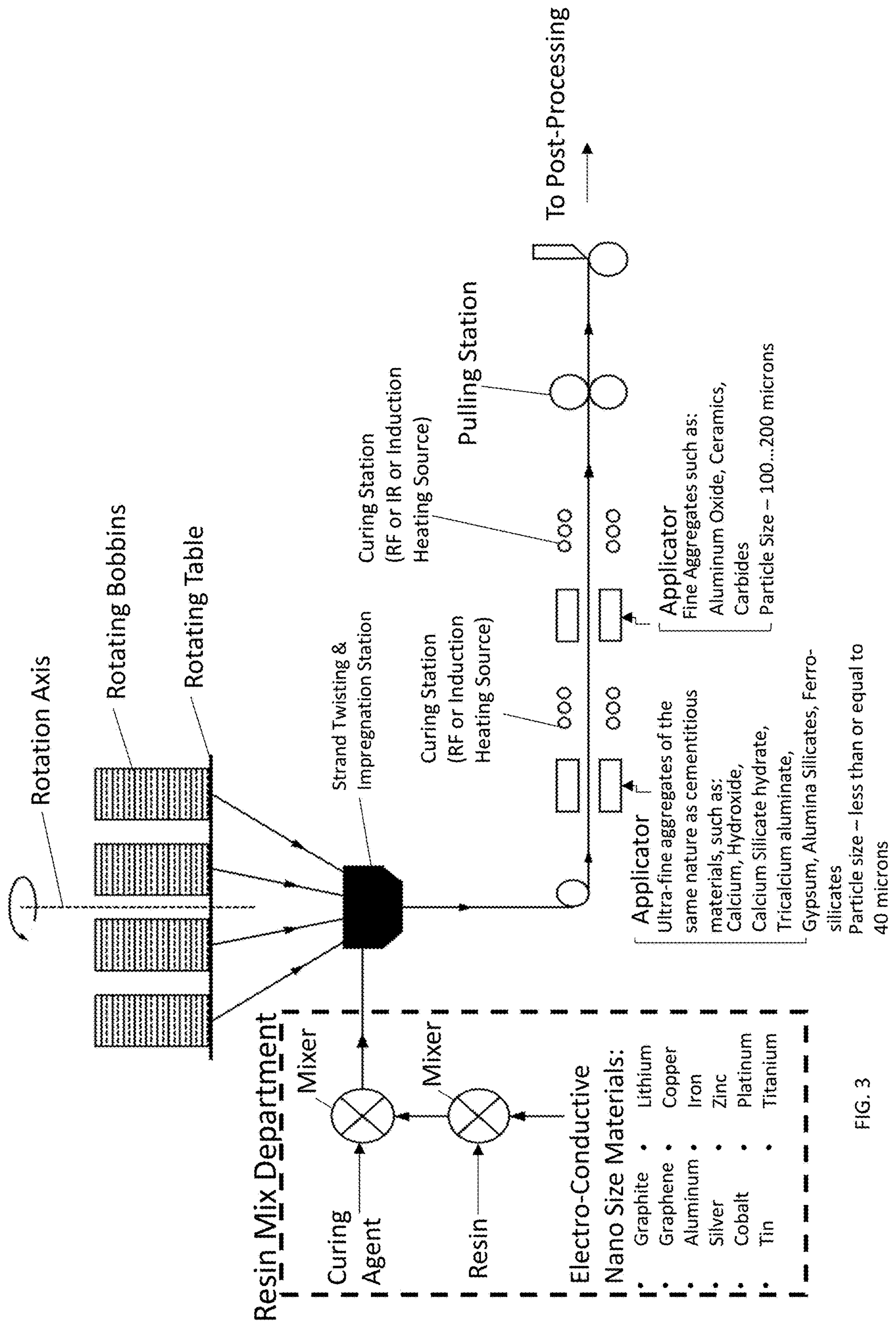
FIG. 3 illustrates a flow diagram of a process for producing fiber composite structures according to one embodiment of the present invention.

FIGS. 2-3 illustrate flow diagrams of a process for producing fiber composite structures according to one embodiment of the present invention. As discussed with reference to FIG. 1, composite fiber (e.g., basalt fiber, andesite fiber, etc.) roving is unwound and passed through a texturizer before entering a resin impregnator. In another embodiment, the composite fibers are twisted and impregnated simultaneously in the resin impregnator. The resin is melted and mixed in a separate chamber, passed through a viscosity stabilizer, and then injected into the resin impregnator in order to impregnate the composite fibers with at least one polymer resin (e.g., polyurethane, polypropylene, high-density polyethylene, etc.).

In one embodiment, when the resin-coated fibers exit the resin impregnator, the resin coated fibers are coated with at least one frictional additive (e.g., aluminum oxide, etc.). After exiting the resin impregnator, the resin-coated fibers enter a first curing chamber, which applies heat in order to cure the resin and thereby solidify the composite structure. If the resin-coated fibers are already coated with the at least one frictional additive, then the first curing chamber uses inductive heating coils to indirectly heat the composite structure, such that external heat does not need to penetrate the frictional additive coating in order to cure the resin.

In one embodiment, after exiting the first curing chamber, the composite structure passes over at least one shaping gear, which provides a 2D or a 3D structure to the composite structure. In another embodiment, the composite structure does not pass over at least one shaping gear. In one embodiment, at least one frictional additive is coated onto the composite structure after the composite structure exits the first curing chamber. The composite structure then enters the second curing chamber. The second curing chamber includes at least one inductive coil, operable to inductively heat the composite structure so as to cure the resin and further solidify the composite structure. Finally, the composite structure is cut into individual minibars, which are then able to be added to concrete.

Figure 4:
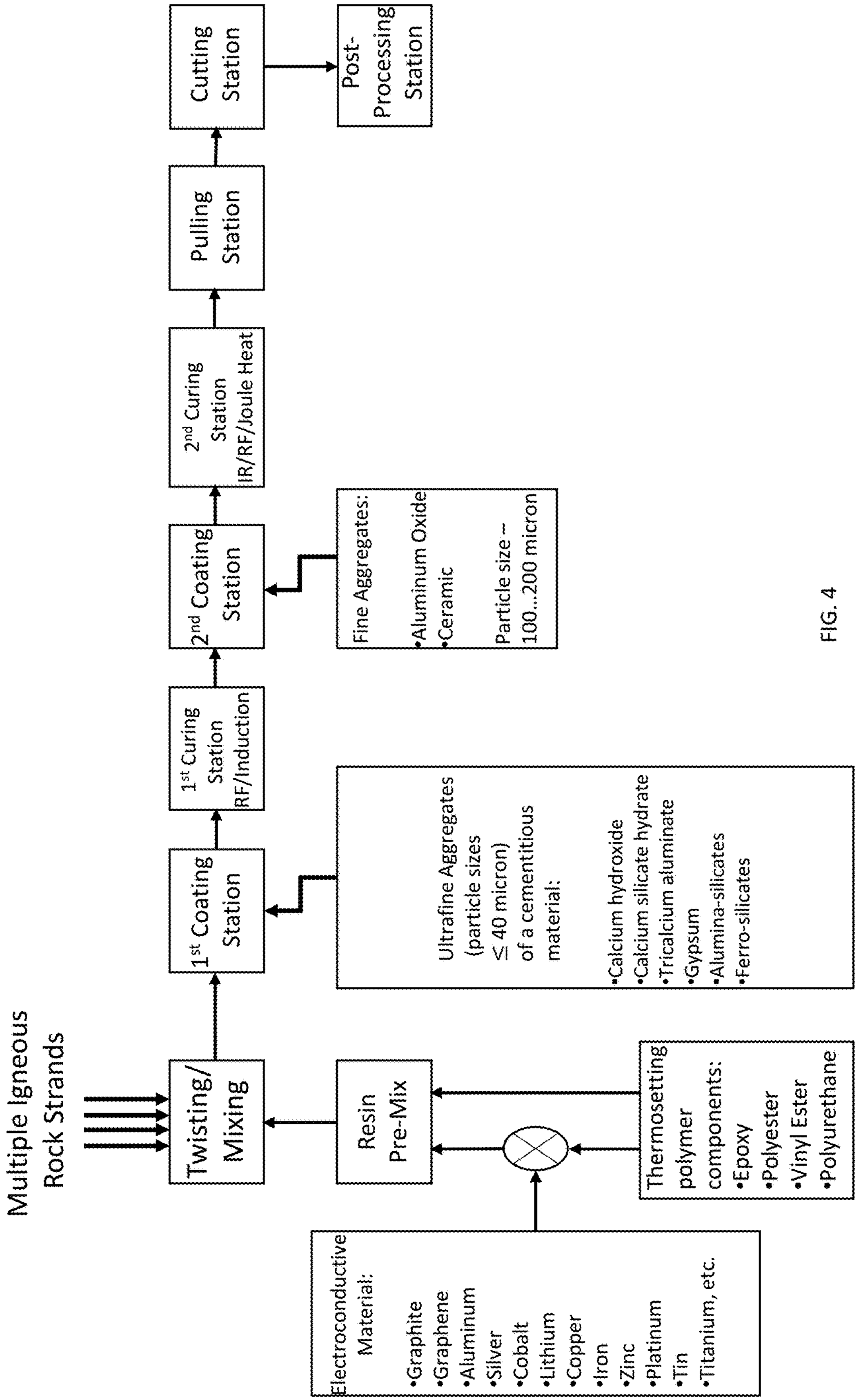
FIG. 4 illustrates a flow diagram of a process for producing fiber composite structures according to one embodiment of the present invention.

FIG. 4 illustrates a flow diagram of a process for producing fiber composite structures according to one embodiment of the present invention. In one embodiment, fibers and polymer resin are added to a resin impregnator. In one embodiment, the polymer resin added to the resin impregnator includes thermosetting polymer components, such as epoxy, polyester, vinyl ester, and/or polyurethane. In one embodiment, one or more electroconductive additives are also added to the resin impregnator. In another embodiment, the one or more electroconductive additives are added to the resin melt before the resin is added to the resin impregnator. In one embodiment, the one or more electroconductive additives are nano sized particles, including a carbon allotrope, such as graphite or graphene, one or more metal additives, such as aluminum, silver, cobalt, lithium, copper, iron, zinc, platinum, tin, titanium, or other metals, and/or salts thereof. In one embodiment, after the fibers are twisted and impregnated with the polymer resin to form fiber composites, the fiber composites are coated with one or more ultrafine aggregates (i.e., particle sizes not larger than approximately 40 microns in diameter). In one embodiment, the ultrafine aggregates include calcium hydroxide, calcium silicate hydrate, tricalcium aluminate, gypsum, alumina-silicates, ferro-silicates, and/or other cementitious materials. The cementitious materials prevent or reduce the formation of a gel-like paste between reacted components along the surface of the fiber composite and therefore improve adhesion of the fiber composites within the concrete. Cementitious composites are characterized by an interfacial transition zone (ITZ) in the vicinity of the reinforcing inclusion, in which the microstructure of the paste matrix is considerably different from that of the bulk paste, away from the interface. The nature and size of this transition zone depends on the type of fiber and the production technology; in some instances, it changes considerably with time. These characteristics of the fiber-matrix interface exert several effects which should be taken into consideration, especially with respect to the fiber-matrix bond, and the debonding process across the interface.

The special microstructure of the transition zone in cementitious composites is closely related to the particulate nature of the matrix. The matrix consists of discrete cement particles ranging in diameter from ~1 to ~100 μm (average size of ~10 μm) in the fresh mix, which, on hydration, react to form mainly colloidal calcium silicate hydrate (CSH) particles and larger crystals of calcium hydroxide (CH). The particulate nature of the fresh mix exerts an important influence on the transition zone, since it leads to the formation of water-filled spaces around the fibers due to two related effects: 1. bleeding and entrapment of water around the reinforcing inclusion, and 2. inefficient packing of the ~10 μm cement grains in the 20-40 μm zone around the fiber surface.

After coating with the ultrafine aggregates, the coated fiber composites are then inductively heated in order to cure the fiber composites. In one embodiment, after inductively heating the fiber composites in a first chamber, the fiber composites are then coated again. In one embodiment, the second coating utilizes fine aggregates (i.e., particles sizes with diameters between about 100 microns and about 200 microns). In one embodiment, the fine aggregates include aluminum oxide and/or one or more ceramic materials. In one embodiment, the fine aggregates are frictional additives designed to improve frictional contact between the fiber composites and the surrounding concrete, reducing chances that the fiber composites slip out of engaging with the concrete. The coated fiber composites are then inductively heated in a second chamber before being pulled and cut into individual minibars. The matrix in the vicinity of the fiber is much more porous than the bulk paste matrix, and this is reflected in the development of the microstructure as hydration proceeds. The initially water-filled transition zone does not develop the dense microstructure typical of the bulk matrix in existing, prior art materials, and it contains a considerable volume of CH crystals, which tend to deposit in large cavities. Based on above mentioned information, the reinforcement fibers have to have very advanced surface topographies with irregularities more than 40 microns. Experimentally it has been found that 80 grit alumina oxides particles provide both very good friction and alkalinity attack protection and thus, in one embodiment, such 80 grit alumina oxide particles are utilized for the fine aggregates. However, the present invention is not limited to 80 grit particles, and both 100 and 120 grit particles are also able to be used.

Figure 5:
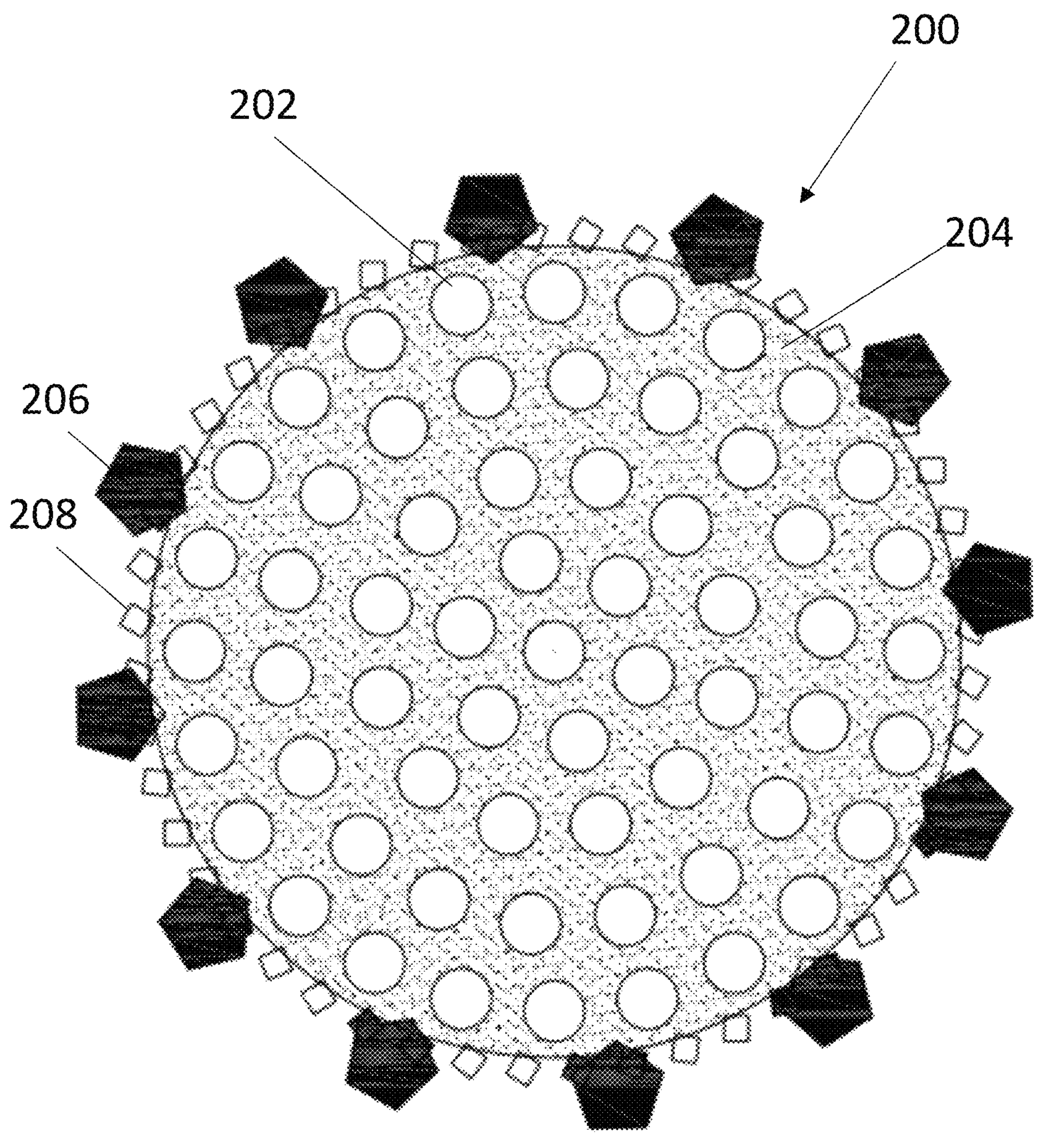
FIG. 5 illustrates a cross-sectional view of a fiber composite structure according to one embodiment of the present invention.

FIG. 5 illustrates a cross-sectional view of a fiber composite structure according to one embodiment of the present invention. A fiber composite structure, or a minibar 200, includes one or more composite fibers, such as igneous rock fibers (e.g., basalt fibers, andesite fibers, etc.) 202, impregnated with at least one polymer resin (e.g., polyurethane, polypropylene, etc.) 204. In one embodiment, the one or more composite fibers and the least one polymer resin are in a core sheath configuration (with the fibers as the core, and the polymer resin as the sheath). In another embodiment, the one or more composite fibers are in an eccentric core sheath and/or a side-by-side core sheath configuration. The combination of the composite fibers 202 and the polymer resin 204 is coated with a first cementitious additive 208 and/or a second frictional additive 206. For example, in one embodiment, the first cementitious additive 208 and/or a second frictional additive 206 nucleate to form small crystal-like structures along the length and circumference of the minibar 200. Importantly, even if the first cementitious additive 208 and/or a second frictional additive 206 does not entirely cover the length and circumference of the minibar 200, any addition provides frictional engagement with the concrete that improves performance and prevents at least some percentage of the degradation of the fiber composites within the concrete to improve performance. In one embodiment, the second frictional additives 206 include particles having diameters between approximately 100 μm and approximately 200 μm. In one embodiment, the first cementitious additives 208 include particles having diameters less than approximately 40 μm.

Experimental results including the minibars of the present invention in concrete demonstrate a pull-out load force (i.e., the amount of force need to rip the fibers out of the concrete) at least two times greater than the pull-out load force needed for existing fiber composites of a similar nature on the market. This means that the minibars' flexural strength and residual strength are demonstrably higher than those of existing fibers previously available on the market.

One of ordinary skill in the art will understand that the structural materials to which the minibars are able to be added are not limited to forms of concrete. By way of example and not limitation, the minibars are able to be added to concrete, asphalt, wood, granite, brick, and/or any form of thermoplastic or thermoset structural material (e.g., polyvinyl chloride (PVC), polyurethane, etc.).

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A fiber composite structural reinforcement, comprising:
a plurality of composite fibers disposed within a polymer resin matrix;
wherein the polymer resin matrix includes at least one electroconductive additive;
wherein an exterior surface of the fiber composite structural reinforcement is coated with a plurality of ultrafine aggregates;
wherein the plurality of ultrafine aggregates prevent or reduce a formation of a gelatinous paste between reacted components along the exterior surface of the fiber composite structural reinforcement and improve adhesion of the fiber composite structural reinforcement within a concrete; and
wherein the exterior surface of the fiber composite structural reinforcement is further coated with a plurality of fine aggregates which do not react with the polymer resin matrix or the plurality of composite fibers.

2. The fiber composite reinforcement of claim 1, wherein the fiber composite structural reinforcement is between approximately 1 inch and approximately 2.5 inches.

3. The fiber composite reinforcement of claim 1, wherein the plurality of ultrafine aggregates include calcium hydroxide, tricalcium aluminate, and/or gypsum.

4. The fiber composite reinforcement of claim 1, wherein the one or more ultrafine aggregates have diameters less than 40 microns.

5. The fiber composite reinforcement of claim 1, wherein the plurality of fine aggregates include aluminum oxide.

6. The fiber composite reinforcement of claim 1, wherein the plurality of fine aggregates have diameters between about 100 microns and about 200 microns.

7. The fiber composite reinforcement of claim 1, wherein the plurality of composite fibers includes basalt and/or andesite fibers.

8. A method for producing a fiber composite structural reinforcement, comprising:
melting at least one resin to form a resin melt;
adding at least one electroconductive additive to the resin melt;
a resin impregnator receives a plurality of composite fibers and impregnating the composite fibers with the resin melt to form one or more composite structures;

coating an exterior surface of the one or more composite structures with one or more ultrafine aggregates such that the one or more ultrafine aggregates prevent or reduce a formation of a gelatinous paste between reacted components along the exterior surface of the fiber composite structural reinforcement and improve adhesion of the fiber composite structural reinforcement within a concrete;

curing the one or more coated composite structures via a first inductive heating step, forming one or more cured composite structures;

further coating the exterior surface of the one or more cured composite structures with one or more fine aggregates, wherein the one or more fine aggregates do not react with the at least one resin or the plurality of the composite fibers;

curing again the one or more cured composite structures via a second inductive heating step; and slicing the one or more cured composite structures into a plurality of composite reinforcement bars.

9. The method of claim 8, wherein the at least one electroconductive additive includes graphene.

10. The method of claim 8, wherein the resin melt includes at least one thermosetting polymer.

11. The method of claim 8, wherein one or more ultrafine aggregates include calcium hydroxide, calcium silicate hydrate, tricalcium aluminate, and/or gypsum.

12. The method of claim 8, wherein the one or more ultrafine aggregates have diameters less than 40 microns.

13. The method of claim 8, wherein the one or more fine aggregates include aluminum oxide.

14. The method of claim 8, wherein the one or more fine aggregates have diameters between about 100 microns and about 200 microns.

15. The method of claim 8, wherein the first inductive heating step is performed in a first chamber and the second inductive heating step is performed in a second, additional chamber.

16. A fiber composite structural reinforcement, comprising:

a plurality of igneous rock fibers disposed within a thermoset polymer resin matrix;

wherein the thermoset polymer resin matrix includes at least one electroconductive additive;

wherein the at least one electroconductive additive includes graphene;

wherein an exterior surface of the fiber composite structural reinforcement is coated with a plurality of ultrafine aggregates;

wherein the exterior surface of the fiber composite structural reinforcement is further coated with a plurality of fine aggregates;

wherein the plurality of ultrafine aggregates prevent or reduce a formation of a gelatinous paste between reacted components along the exterior surface of the fiber composite structural reinforcement and improve adhesion of the fiber composite structural reinforcement within a concrete;

wherein the reacted components include the fiber composite structural reinforcement and concrete;

wherein the plurality of fine aggregates do not react with the thermoset polymer resin matrix or the plurality of igneous rock fibers; and wherein the fiber composite structural reinforcement is between approximately 1 inch and approximately 2.5 inches.

17. The fiber composite reinforcement of claim 16, wherein the one or more ultrafine aggregates have diameters less than 40 microns.

18. The fiber composite reinforcement of claim 16, wherein the one or more fine aggregates have diameters between about 100 microns and about 200 microns.

19. The fiber composite reinforcement of claim 16, wherein the plurality of igneous rock fibers includes basalt and/or andesite fibers.

* * * * *